UNITED STATES PATENT OFFICE.

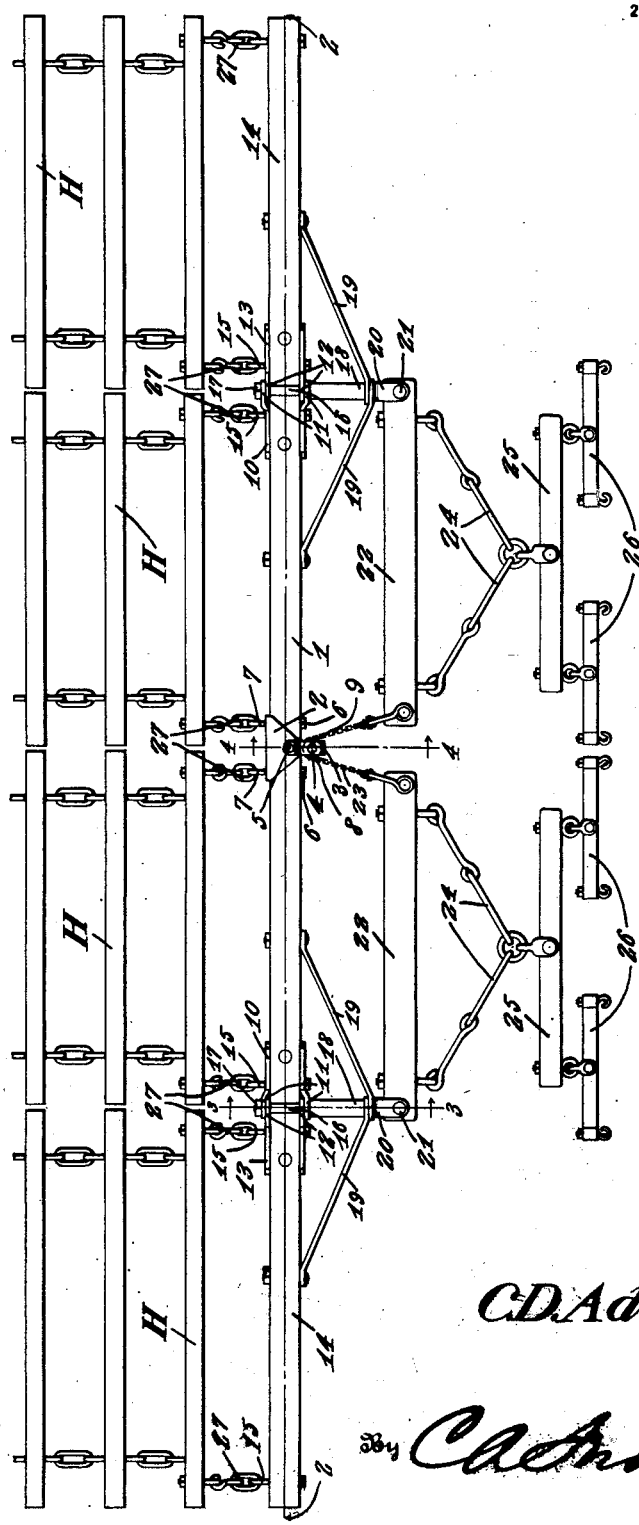

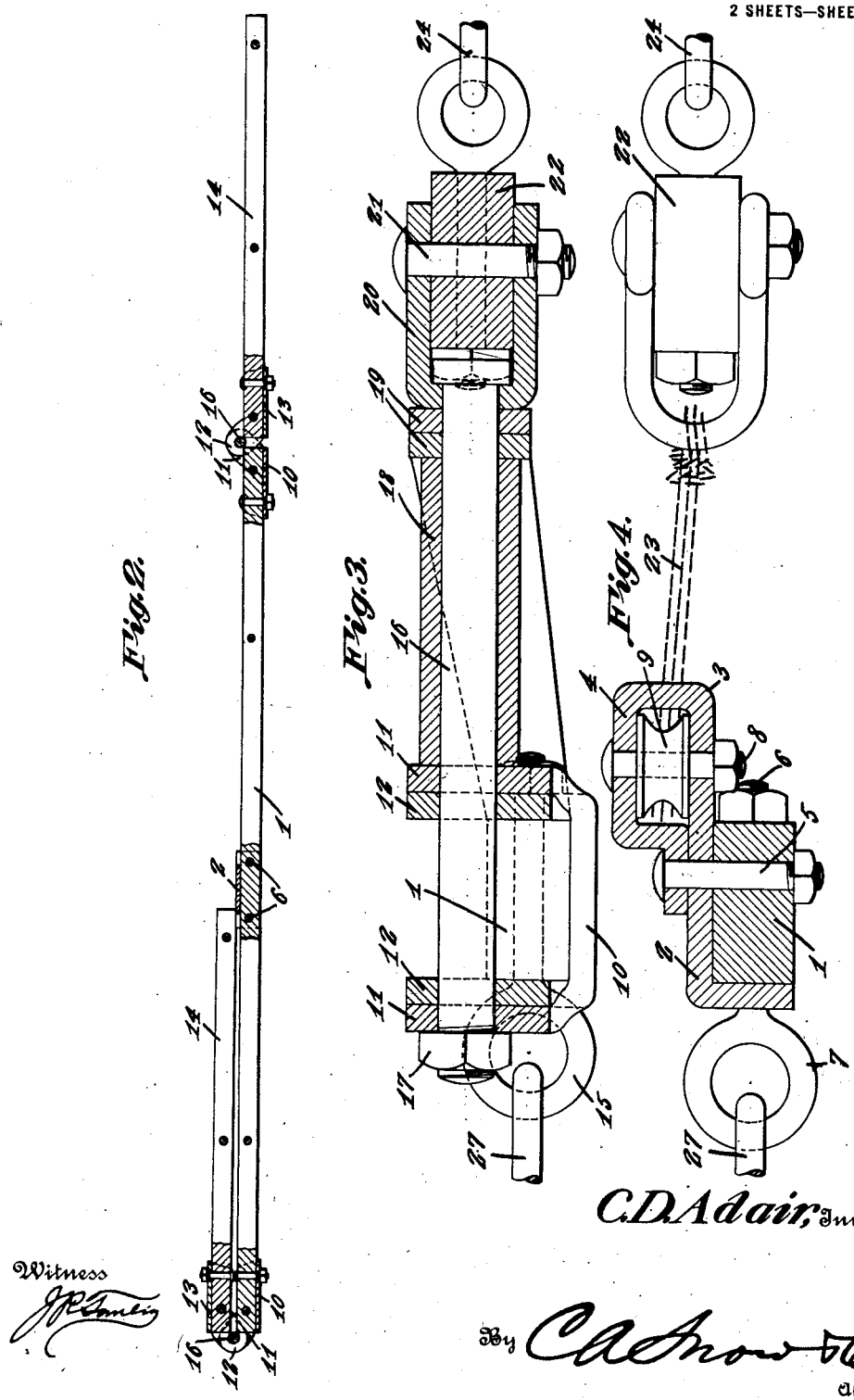

CLAUDE D. ADAIR, OF SHELLROCK, IOWA.

HARROW.

1,273,801.

Specification of Letters Patent.

Patented July 30, 1918.

Application filed April 19, 1918. Serial No. 229,559.

*To all whom it may concern:*

Be it known that I, CLAUDE D. ADAIR, a citizen of the United States, residing at Shellrock, in the county of Butler and State of Iowa, have invented a new and useful Harrow, of which the following is a specification.

This invention relates to harrows, one of its objects being to provide a structure of this character utilizing a sectional draft bar to which harrow sections may be attached, the end sections of said bar, together with the harrow sections connected thereto, being foldable inwardly so as to reduce the width of the harrow and permit it to be drawn readily through a gate opening.

A further object is to provide a harrow which, when folded, will not disarrange the draft devices.

Another object is to provide simple and efficient means for bracing the harrow, said bracing means being foldable with the sections of the draft bar.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of parts without departing from the spirit or sacrificing any of the advantages of the invention as set forth in the appended claims.

In the accompanying drawings the preferred form of the invention has been shown.

In said drawings—

Figure 1 is a plan view of a harrow embodying the present improvements.

Fig. 2 is a section on line 2—2, Fig. 1.

Fig. 3 is a section on line 3—3, Fig. 1.

Fig. 4 is a section on line 4—4, Fig. 1.

Referring to the figures by characters of reference, 1 designates the middle section of the draft or connecting bar of the harrow, the middle portion of this section being straddled by a plate 2 which extends back of the section and forwardly over it. A tongue 3 is provided by the forwardly extending portion of the plate, this tongue being extended beyond the beam section 1 and bent over and back to form a loop 4, the bolt employed for fastening the plate down upon the beam section 1 being also employed to hold the loop closed, as shown in Fig. 4. This bolt has been designated at 5. Other bolts 6 are extended through the back portion of the plate and forwardly through the beam section 1 and are provided at their rear ends with eyes 7. A bolt 8 is secured within the loop 4 and constitutes a bearing for a sheave 9.

Secured to each end of the beam section 1 is a hinge member 10 having ears 11 extending beyond the end of said section and adapted to lap similar ears 12 projecting from the hinge members 13 which are secured to the inner ends of end sections of the beam, said end sections being shown at 14. Some of the bolts used for fastening the hinge members to the sections 1 and 14 are provided at their rear ends with eyes 15, similar to the eyes 7.

The lapping ears 11 and 12 are connected by a pivot rod 16 having a nut 17 at its rear end, as shown in Fig. 3 and having its front portion extended forwardly through a spacing sleeve 18, through the forward ends of braces 19 and into a yoke 20, there being a head at the front end of the rod and within the yoke to prevent the yoke from pulling off of the rod. A pivot bolt 21 extends through the yoke and through one end of a lever 22. Two of these levers are used, as shown in Fig. 1 and they are extended toward each other, the inner ends of the levers being connected to the ends of a chain 23 or other flexible element which passes through the loop 4 and engages the sheave 9.

Connected to the end portions of each lever 22 is a chain 24 the middle portion of which is attached to the center portion of a whiffletree 25 carrying swingle trees 26. Thus it will be seen that the draft will be equalized between the two pairs of draft animals through the swinging levers connected by the chain 23.

The braces 19 are attached to the middle section 1 and to the end sections 14 respectively of the connecting or draft bar and serve to hold the sections in line during the operation of the harrow. The eyes 7 and 15 hereinbefore referred to are engaged by the forward ends of chains 27 which serve to couple harrow sections H to the sections of the connecting bar.

It will be noted that either or both end sections of the connecting bar can be folded flat onto the middle section 1 and that the harrow sections H can be similarly folded. Thus the harrow can be drawn readily through a gate opening without disarranging the draft devices. Importance is attached to the fact that the pull upon the harrow is exerted upon the hinge connections longitudinally of the pintles of the hinges, thus preventing any tendency of the end sections to break off at the hinges. As the end sections can flex relative to the middle section the harrow is particularly useful on uneven ground.

What is claimed is:—

1. A harrow including sections foldable one upon the other, a hinge connecting the sections and including a forwardly extending rod constituting the pintle of the hinge, braces extending from the sections and having lapping ends engaged by the forward portion of the rod, a spacing element upon the rod and between the sections and the lapping ends of the braces, and draft means connected to the forward end of the rod.

2. A harrow including a connecting bar comprising an intermediate section and end sections foldable onto the intermediate section, hinge connections between the sections and each including a forwardly extending rod constituting the pintle of the hinge, levers connected to the outer ends of the respective rods and extending toward each other, a flexible connection between the levers, means for movably attaching said connection to the intermediate section of the bar, and draft means carried by the levers.

In testimony that I claim the foregoing as my own, I have hereto affixed my signature in the presence of two witnesses.

CLAUDE D. ADAIR.

Witnesses:
 A. W. HUGHES,
 V. A. MAX.